United States Patent [19]

Huelsmann

[11] Patent Number: 5,729,445
[45] Date of Patent: Mar. 17, 1998

[54] REGULATED POWER SUPPLY UNIT WITH AN ELECTRONIC TRANSFORMER

[75] Inventor: Dieter Huelsmann, Solms, Germany

[73] Assignee: Leica Mikroskopie Und Systeme GmbH, Wetzlar, Germany

[21] Appl. No.: 687,422

[22] PCT Filed: Jan. 31, 1995

[86] PCT No.: PCT/DE95/00149

§ 371 Date: Sep. 6, 1996

§ 102(e) Date: Sep. 6, 1996

[87] PCT Pub. No.: WO95/21514

PCT Pub. Date: Aug. 10, 1995

[30] Foreign Application Priority Data

Feb. 7, 1994 [DE] Germany .................. 44 03 707.4

[51] Int. Cl.[6] .................. H02J 3/00; H02M 3/24
[52] U.S. Cl. .................. 363/34; 363/95
[58] Field of Search .................. 363/34, 37, 95, 363/97, 98, 22–26

[56] References Cited

U.S. PATENT DOCUMENTS

| | | | |
|---|---|---|---|
| 3,578,914 | 5/1971 | Simonelli | 370/284 |
| 4,506,318 | 3/1985 | Nilssen | 363/98 |
| 5,159,245 | 10/1992 | Nilssen | 315/206 |
| 5,289,360 | 2/1994 | Canova | 363/56 |

OTHER PUBLICATIONS

"Insta–Impulse durch Elektronik 92/93", [Insta Impulses Through Electronics 92/93], sales brochure of Insta Elektro GmbH & Co. KG.

"Transformatoren und Dimmer fuer NV–Halogenlampen", [Transformers and Dimer for Low–Voltage Halogen Lamps], The Electronics Manual from berker GmbH & Co., vol. 4.

Primary Examiner—Peter S. Wong
Assistant Examiner—Bao Q. Vu
Attorney, Agent, or Firm—Foley & Lardner

[57] ABSTRACT

A regulated power supply unit with an electronic transformer having an input for a transformer power supply voltage on the primary side, an output for an operating a.c. voltage with a higher-frequency component on the secondary side, and a control device with a variable resistor by means of which the operating a.c. voltage may be set. There is an inductive or capacitive separator component by means of which the higher-frequency component of the operating a.c. voltage can be separated out and taken as the input voltage to a first and a second rectifier circuit. The output voltage of the first rectifier circuit is applied to an amplifier-comparator circuit as its supply voltage. A reference generator circuit is connected to the first rectifier circuit and to the amplifier-comparator circuit. A reference for the operating a.c. voltage can be set by the reference generator circuit. An actual value is derived from the output voltage of the second rectifier circuit and taken to the amplifier-comparator circuit, at the output of which an error signal may be taken. A transistor constitutes the variable resistor and is controlled by the error signal from the amplifier-comparator circuit.

20 Claims, 2 Drawing Sheets

REGULATED POWER SUPPLY UNIT WITH AN ELECTRONIC TRANSFORMER

BACKGROUND

The invention relates to a regulated power supply unit with an electronic transformer.

Electronic transformers have been commercially available for a number of years. An "electronic transformer" essentially contains the following assemblies. A first assembly in the form of a full-wave rectifier which, in the case of a normal mains AC voltage of, for example, 230 V and 50 Hz, emits at its output a voltage of about 230 V and 100 Hz. A free-running oscillator forms a second assembly, which normally oscillates at a frequency of about 40 KHz depending on the manufacture of the electronic transformer. An AC voltage of about 230 V is now present at a frequency of 40 KHz and modulated at 100 Hz. A third assembly is formed by a conventional transformer. Because of the high-frequency input voltage, the latter need be only very small in comparison with 50 Hz transformers, and supplies a relatively high power with very high efficiency. For example, an AC voltage of 12 V and 40 KHz is present at the output of the transformer, and is modulated at 100 Hz. A fourth assembly is formed by a phase gating control circuit and/or a phase chopping control circuit. This circuit defines the period of oscillation of the oscillator within the mains oscillation period, and thus the transformed, root-mean-square power. In order to control the period of oscillation of the oscillator, the phase gating control circuit is connected to a potentiometer, on which the root-mean-square value of the oscillator voltage, and thus the output voltage of the electronic transformer, can be set.

The peak value of the output voltage of the electronic transformer is determined by the amplitude of the higher-frequency AC voltage. This peak value changes relatively little with respect to the phase gating control. However, in the adjustment range towards relatively low voltages, difficulties arise with respect to fluctuations in the supply voltage on the primary side of the electronic transformer, and these fluctuations are not regulated out.

If such an electronic transformer is used to supply power to a lighting device which includes, for example, a halogen lamp, then the brightness of the lighting device can be adjusted with the aid of the potentiometer, which is connected to the circuit for phase gating control. It has been found that mains voltage fluctuations are transferred more than proportionally to the load current in the lower, weak brightness region. This is disadvantageous for relatively demanding applications of a lighting device, for example in the case of a microscope.

Power supply units are available which have very good current or voltage stabilization. However, these power supply units are complex and costly.

SUMMARY OF THE INVENTION

The object of the invention is to develop a regulated power supply unit of a generic type such that the output magnitude can be kept as constant as possible over the entire adjustment range, virtually independently of fluctuations in the supply voltage for the power supply unit.

This object is achieved in the case of a power supply unit by the features specified.

A conventional, commercially available electronic transformer, in which the magnitude of the output voltage is controlled by changing a resistance value, can be used in an advantageous manner with the power supply unit according to the invention. This resistance value is normally set with the aid of a potentiometer, according to the prior art.

A basic idea of the invention is to use a transistor as the variable resistor, which is controlled by a regulator such that the output magnitude of the power supply unit is kept as constant as possible, irrespective of mains voltage fluctuations. According to the invention, the actual value for this regulator, the supply voltage for the active components of the regulator, and the formation of the reference value are obtained simultaneously by outputting the higher-frequency AC voltage components on the load side of the regulated power supply unit according to the invention.

One particular advantage is that it is not necessary to intervene in the circuit arrangement of the electronic transformer, so that the latter can be used as it is.

Advantageous further developments of the subject matter of the invention are specified below.

In a particularly advantageous development of the subject matter of the invention, the output element is a transformer having a core, a primary winding connected in series with the load, and a secondary winding which supplies the input voltage for the first rectifier circuit and the second rectifier circuit.

In this way, the actual value and the supply voltage can be obtained in a very simple manner. A further advantage is that, in this case, a type of current stabilization is achieved and, in consequence, different conductor lengths and diameters, as well as contact resistances to plug connections and terminals can be partially regulated out as well. In addition, in the case of this refinement, DC isolation is maintained between the regulator and the low-voltage load circuit, as is frequently required by safety regulations. Furthermore, the regulator is also floating when no load current is flowing.

The abovementioned advantageous development of the invention can be designed in a particularly favorable manner if the primary winding is formed by one wire of a load supply line. A particularly simple refinement can be achieved if the conductor wire is passed directly through the core of the transformer, without being looped around it. This core is advantageously an annular core, because of the simple construction.

According to a further advantageous development, a smoothing element having a voltage stabilizer is connected downstream of the first rectifier circuit, which is preferably a peak detector circuit, the voltage stabilizer preferably being a zener diode and the smoothing element having a long time constant so that its output voltage is essentially independent of the changing load current. As a result of this, a higher constant supply voltage is thus maintained for the regulator circuit.

According to another advantageous development, a smoothing element is connected downstream of the second rectifier circuit. This smoothing element is used as an averaging device for the respectively flowing higher-frequency load current.

A further different development of the subject matter of the invention is for the output element to be a transformer whose primary winding is connected in parallel with the output and with the load, and whose secondary winding supplies the input voltage for the first rectifier circuit and the second rectifier circuit. The output can be effected with the aid of a transformer having a small physical size and having a small number of turns for the two windings. In the case of a transformer which is connected in such a manner, there is only one voltage transfer, so that the advantages of current stabilization are not maintained. Nevertheless, however, good stabilization of the output magnitude can be achieved, overall. When the load is turned off, so that no load current is flowing, the supply voltage for the regulator is maintained, since the primary winding is connected in parallel with the output.

According to another development of the subject matter of the invention, capacitors are used as output elements. There is no current-stabilizing effect in this refinement, because of the capacitive output matter, in parallel with the output. However, good stabilization of the output magnitudes can nevertheless be achieved.

In principle, it is also possible within the framework of the invention to use a piece of conductor as the output element, which runs parallel with only a section of one wire of the load supply line. The output efficiency in the case of this refinement is low. Care must be taken with regard to the geometric arrangement of the piece of conductor, on which the magnitude of the output voltage also depends. It is necessary to avoid the second wire in the load circuit running parallel to the output section, in order that the output effect is not canceled out. However, the simplicity of the output can scarcely be beaten.

BRIEF DESCRIPTION OF THE DRAWINGS

The subject matter of the invention will be described in the following text using embodiments and making reference to the figures, which show schematic block diagrams.

In detail.

DESCRIPTION OF PREFERRED EMBODIMENTS

Figure 1:
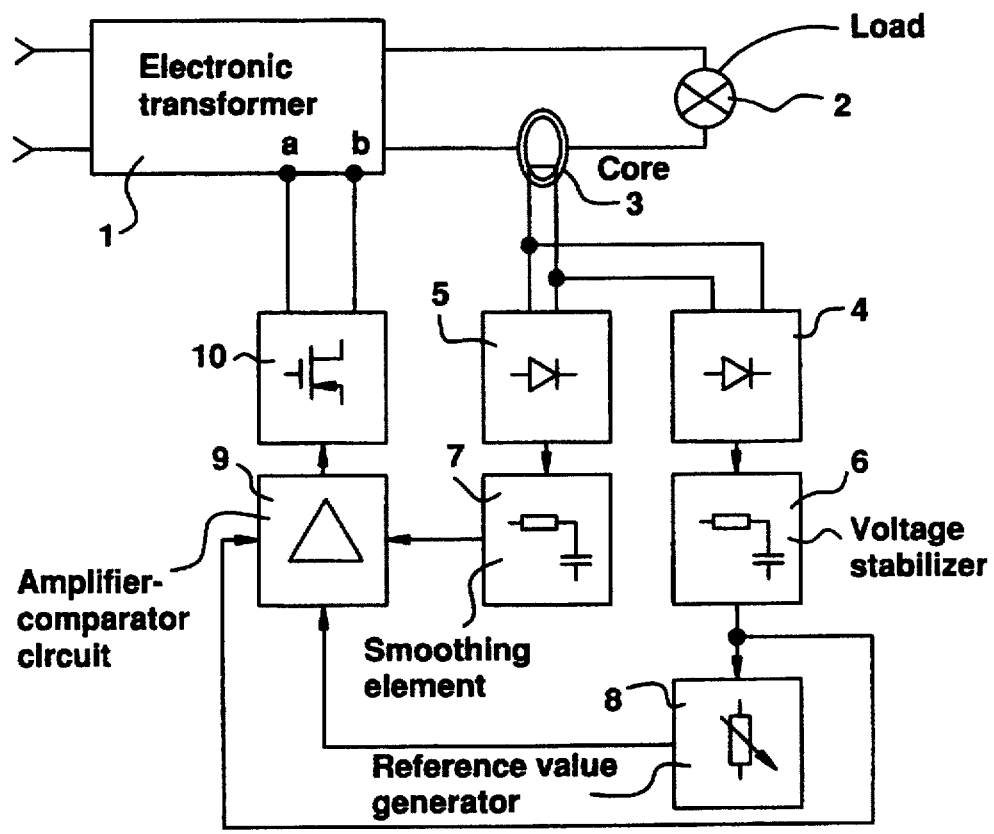
FIG. 1 shows a complete block diagram with an annular core for the output.

An electronic transformer 1 is connected on its secondary side to a load 2 which may be, for example, a lamp. One wire of the load supply line is passed through an annular core 3.

The annular core 3 has a secondary winding, which is connected to the input of a first rectifier circuit 4, and to the input of a second rectifier circuit 5, in parallel. The first rectifier circuit 4 is designed as a peak detector. The output of the first rectifier circuit 4 is connected to the input of a smoothing element having a voltage stabilizer 6, a long time constant being chosen for the voltage stabilizer 6. In consequence, the output voltage remains essentially independent of the changing load current.

The output voltage of the smoothing element with the voltage stabilizer 6 is used as the supply voltage for an amplifier-comparator circuit 9. Furthermore, the output voltage of the smoothing element with the voltage stabilizer 6 is supplied to a reference value generator 8, by means of which the output voltage on the load side of the regulated power supply unit can be adjusted.

The output of the reference value generator 8 is connected to a first connection of the amplifier-comparator circuit 9.

A smoothing element 7 is connected downstream of the second rectifier circuit 5 and is used as an averaging device for the respectively flowing, higher frequency load current.

Mains voltage fluctuations lead to a change in the load current and thus to the detected mean value. The output of the smoothing element 7 is connected to a second input of the amplifier-comparator circuit 9.

The comparison between the reference value, which is obtained at the output of the reference value generator 8, and the actual value, which is obtained from the smoothing element 7, is carried out in the amplifier-comparator circuit 9. An error signal, which corresponds to the mains voltage fluctuations, is obtained at the output of the amplifier-comparator circuit 9, based on the difference between the reference value and the actual value.

The electronic transformer 1 has two connections a and b which, according to the prior art, are normally connected to the terminals of a variable resistor, such as a potentiometer. The output voltage of the electronic transformer 1 can be set as a function of the resistance value of the variable resistor.

In the case of the exemplary embodiment described here, the resistor having a variable resistance value is a transistor 10, which obtains its supply voltage via the connections a and b of the electronic transformer 1. The output signal of the amplifier-comparator circuit 9, that is to say the error signal, is used to control the resistance value of the transistor such that the magnitude of the error signal is minimal (P regulator).

The first rectifier circuit 4 and the second rectifier circuit 5, the smoothing element with the voltage stabilizer 6, and the smoothing element 7 as well as the reference value generator 8 can be constructed from passive components. Only the amplifier-comparator circuit 9 now remains as an active element, which requires a supply voltage for its operation. The supply voltage for the transistor 10 is obtained via the connections a and b of the electronic transformer 1, and these connections are normally connected, for example, to a potentiometer.

Figure 2:
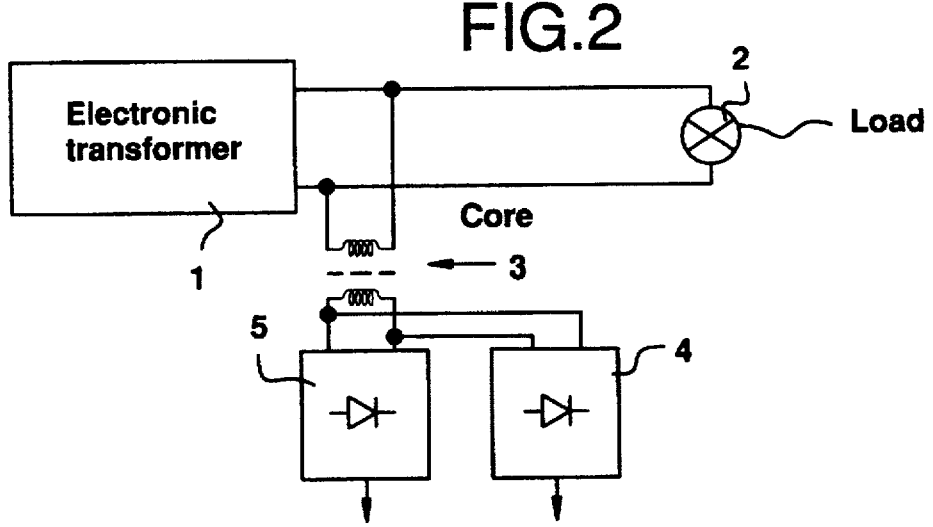
FIG. 2 shows the output with a transformer connected in parallel with the load.
Figure 3:
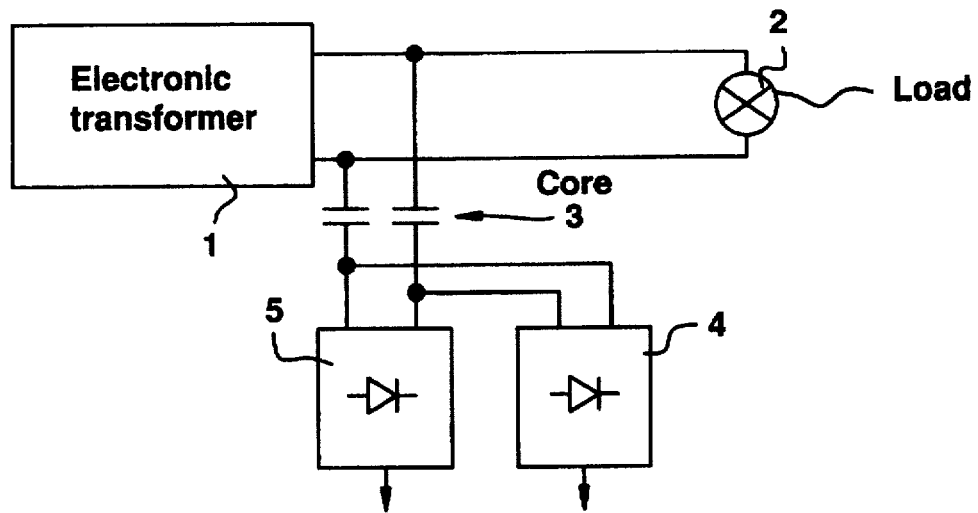
FIG. 3 shows the output with capacitors connected in parallel with the load.
Figure 4:
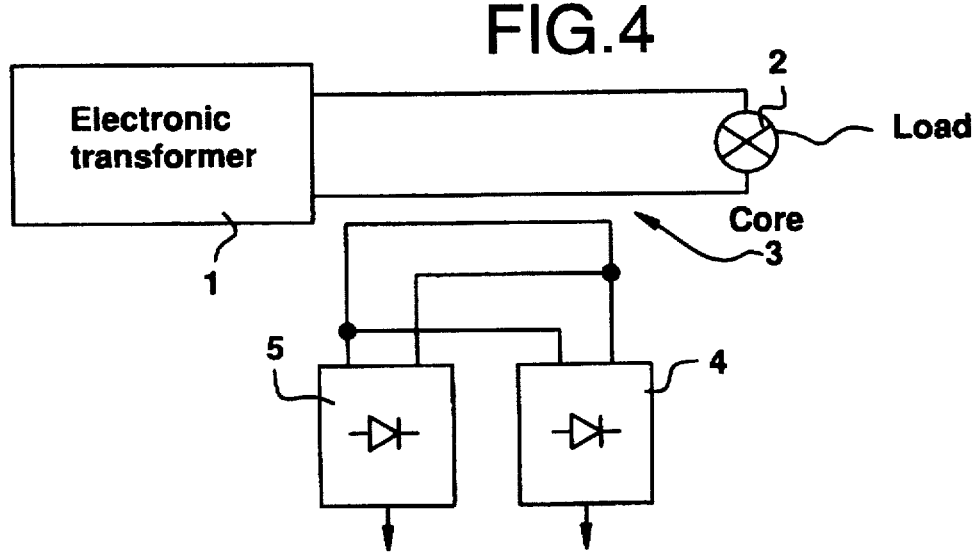
FIG. 4 shows the output via a piece of conductor.

In FIGS. 2 to 4, components having the same effect have the same references as in FIG. 1.

It can be seen from FIG. 2 that the output transformer 3, which is connected in parallel with the output of the electronic transformer 1, requires more turns for voltage transfer than the previously described annular core. It is thus more complex. Since it has a considerably higher impedance than the load, the current-stabilizing effect is lost.

This also applies to the capacitors which are illustrated in FIG. 3 and are connected in parallel with the output of the electronic transformer 1. This circuit is also relatively complex, since one capacitor must be provided for each of the load lines and these capacitors must be of a particular type, for reasons of DC isolation.

The arrangement which is illustrated in FIG. 4 and has a piece of conductor which is arranged in parallel with a load line and is possibly twisted with it, demonstrates the simplicity of the output circuit, which has already been mentioned above.

Care must be taken to ensure that the other load line is routed sufficiently far away or is screened at the output element.

The subject matter of the invention has been described in conjunction with a lighting device being used as the load, that is to say a lamp. It is self-evident that there is no limitation just to a load element of this type, and other load elements may be used.

A transistor has been mentioned as being preferable as the controllable resistor. In a more complex arrangement, the brightness of a light-emitting diode, for example, could also be varied by the regulator and its radiation could be passed to a photoresistor which is connected to the inputs a and b of the electronic transformer. Together with the annular core, this circuit would have the advantage of complete DC isolation of the regulator circuit as far as the photoresistor, as well. Only the latter would still be at the mains potential.

I claim:

1. Regulated power supply unit with an "electronic transformer", which comprises an input on the primary side for a transformer supply voltage, an output on the secondary side for an AC operating voltage, which has a higher-frequency component, for a load, and a control device having a variable resistance element, by means of which the AC operating voltage can be adjusted, characterized by an inductive or capacitive output element (3), by means of which the higher-frequency component of the AC operating voltage can be output, the higher frequency component being supplied as the input voltage to in each case one first rectifier circuit (4) and one second rectifier circuit (5), an amplifier-comparator circuit (9), to which the output voltage of the first rectifier circuit (4) is applied, after smoothing, as its supply voltage, and a reference value generator circuit (8) which is connected to the first rectifier circuit (4) and to the amplifier-comparator circuit (9) and by means of which a reference value for the AC operating voltage can be adjusted, and an actual value being derived from the output voltage of the second rectifier circuit (5) and being supplied to the amplifier-comparator circuit (9), at whose output an error signal can be picked off, and a transistor (10) which forms the variable resistance element and is driven by the error signal from the amplifier-comparator circuit (9).

2. Power supply unit according to claim 1, characterized in that the output element is a transformer having a core (3), a primary winding connected in series with the load, and a secondary winding which supplies the input voltage for the first rectifier circuit (4) and the second rectifier circuit (5).

3. Power supply unit according to claim 2, characterized in that the primary winding of the transformer is formed by a conductor wire in the supply line for the load (2).

4. Power supply unit according to claim 2, characterized in that the core is an annular core (3).

5. Power supply unit according to claim 3, characterized in that the conductor wire of the supply line for the load (2) forms the primary winding, without being looped around the core (3).

6. Power supply unit according to claim 1, characterized in that the output element is a transformer whose primary winding is connected in parallel with the load (2), and whose secondary winding supplies the input voltages for the first rectifier circuit (4) and the second rectifier circuit (5).

7. Power supply unit according to claim 1, characterized in that the output element is a capacitor.

8. Power supply unit according to claim 1, characterized in that a smoothing element having a voltage stabilizer (6) is connected downstream of the first rectifier circuit (4), and its output supplies the supply voltage for the amplifier-comparator circuit (9).

9. Power supply unit according to claim 1, characterized in that a smoothing element (7) is connected, as an averaging device, downstream of the second rectifier circuit (5), and its output is connected to a second comparison input of the amplifier-comparator circuit (9).

10. Power supply unit according to claim 3, characterized in that the core is an annular core.

11. A regulated power supply unit for an electronic transformer which has an input on a primary side for a transformer supply voltage, an output on a secondary side for a load, the output providing an AC operating voltage that has a higher-frequency component, and a control device having a variable resistance element to adjust the AC operating voltage, the regulated power supply unit comprising:

an output element to output the higher-frequency component of the AC operating voltage;

a first rectifier circuit which receives the higher-frequency component from the output element;

a second rectifier circuit which receives the higher-frequency component from the output element;

an amplifier-comparator circuit which receives a smoothed output of the first rectifier circuit as its supply voltage and an actual value derived from an output voltage of the second rectifier circuit to generate an error signal;

a reference value generator circuit connected to the first rectifier circuit and the amplifier-comparator circuit for adjusting a reference value for the AC operating voltage; and a transistor which forms the variable resistance element and is driven by the error signal from the amplifier-comparator circuit.

12. A power supply unit according to claim 11, wherein the output element is a transformer having a core, a primary winding connected in series with the load, and a secondary winding which supplies input voltages for the first rectifier circuit and the second rectifier circuit.

13. A power supply unit according to claim 12, wherein the primary winding of the transformer is formed by a conductor wire in a supply line for the load.

14. A power supply unit according to claim 12, wherein the core is an annular core.

15. A power supply unit according to claim 13, wherein the conductor wire in the supply line for the load forms the primary winding without being looped around the core.

16. A power supply unit according to claim 11, wherein the output element is a transformer whose primary winding is connected in parallel with the load, and whose secondary winding supplies input voltages for the first rectifier circuit and the second rectifier circuit.

17. A power supply unit according to claim 11, wherein the output element is a capacitor.

18. A power supply unit according to claim 11, further comprising a smoothing element having a voltage stabilizer downstream of the first rectifier circuit and having an output which supplies the supply voltage for the amplifier-comparator circuit.

19. A power supply unit according to claim 11, further comprising a smoothing element for averaging, downstream of the second rectifier circuit and having an output connected to the amplifier-comparator circuit.

20. A power supply unit according to claim 13, wherein the core is an annular core.

* * * * *